(12) United States Patent
Gajare et al.

(10) Patent No.: US 12,488,939 B2
(45) Date of Patent: Dec. 2, 2025

(54) UNIVERSAL AC/DC CURRENT SENSOR AND ISOLATOR

(71) Applicant: Georgia Tech Research Corporation, Atlanta, GA (US)

(72) Inventors: Pranjal M. Gajare, Atlanta, GA (US); Shreyas Kulkarni, Atlanta, GA (US); Deepak M. Divan, Atlanta, GA (US); Ruomu Hao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 129 days.

(21) Appl. No.: 18/694,294

(22) PCT Filed: Sep. 23, 2022

(86) PCT No.: PCT/US2022/076937
§ 371 (c)(1),
(2) Date: Mar. 21, 2024

(87) PCT Pub. No.: WO2023/049845
PCT Pub. Date: Mar. 30, 2023

(65) Prior Publication Data
US 2025/0132089 A1     Apr. 24, 2025

Related U.S. Application Data

(60) Provisional application No. 63/247,543, filed on Sep. 23, 2021.

(51) Int. Cl.
*H01F 38/32* (2006.01)
*G01R 15/18* (2006.01)

(52) U.S. Cl.
CPC .......... *H01F 38/32* (2013.01); *G01R 15/181* (2013.01)

(58) Field of Classification Search
CPC ........ H01F 38/32; G01R 15/181; Y02E 10/56
See application file for complete search history.

(56) References Cited

U.S. PATENT DOCUMENTS

2011/0012587 A1*  1/2011  Greenberg ........... G01R 15/181
                                                                  324/114
2014/0333290 A1*  11/2014  Boudreau, Jr. ...... G01R 15/181
                                                                  324/123 R
(Continued)

FOREIGN PATENT DOCUMENTS

JP          2020197384 A     12/2020

OTHER PUBLICATIONS

International Search Report and Written Opinion from Application No. PCT/US2022/076937 dated Dec. 28, 2022.
(Continued)

*Primary Examiner* — Giovanni Astacio-Oquendo
*Assistant Examiner* — Haidong Zhang
(74) *Attorney, Agent, or Firm* — TROUTMAN PEPPER LOCKE LLP; Ryan A. Schneider; Brandon M. Reed

(57) ABSTRACT

An exemplary embodiment of the present disclosure provides a current sensor comprising a current input, a current output, a first current path, and a second current path parallel to the first current path, a Rogowski coil current sensor, and a controller. The first current path can comprise a first switch. When the first switch is in a closed position, current can flow along the first current path between the current input and the current output. The second current path can comprise a second switch. When the second switch is in a closed position, current can flow along the second current path between the current input and the current output. At least one of the first current path and the second current path
(Continued)

can pass through an aperture of the Rogowski coil. The controller can be configured to control the first and second switches.

21 Claims, 15 Drawing Sheets

(56) References Cited

U.S. PATENT DOCUMENTS

| | | | |
|---|---|---|---|
| 2015/0028850 A1* | 1/2015 | Pascal | G01R 15/181 |
| | | | 324/76.11 |
| 2017/0117699 A1 | 4/2017 | Ostrovsky et al. | |
| 2019/0064225 A1 | 2/2019 | Parkhideh et al. | |
| 2019/0310289 A1* | 10/2019 | Miller | G01R 15/181 |
| 2020/0309823 A1* | 10/2020 | Beiner | G01R 19/0092 |

OTHER PUBLICATIONS

Extended European Search Report in European Application No. EP22873886.0, mailed Jun. 24, 2025 (8 pages).

* cited by examiner $I_{meas}$

UNIVERSAL AC/DC CURRENT SENSOR AND ISOLATOR

CROSS-REFERENCE TO RELATED APPLICATIONS

This application claims the benefit of U.S. Provisional Application Ser. No. 63/247,543, filed on 23 Sep. 2021, which is incorporated herein by reference in its entirety as if fully set forth below.

FIELD OF THE DISCLOSURE

The various embodiments of the present disclosure relate generally to current sensors and isolating circuits.

BACKGROUND

The power grid is undergoing a significant transformation due to the advances in power electronics and semiconductor technologies, helping grid operators integrate an increasing number of distributed energy resources ("DERs") into the grid. The DERs include battery storage systems, electric vehicles ("EVs"), rooftop photovoltaic ("PV") systems with inverters, etc. These DERs are often a combination of alternating current ("AC") and direct current ("DC") type resources—for instance, rooftop PV arrays are DC sources, but the grid connection is achieved through an AC inverter. Additionally, with the electrification of transportation and the rapid proliferation of EVs and their charging stations, there is a significant requirement for AC and DC current sensors and systems that can aid in monitoring and control. Current sensors are fundamental building blocks in these monitoring systems, and as batteries—an inherently DC resource—get integrated into grid-connected systems, there is a strong need for developing low-cost current sensors that can measure AC as well as DC currents over a wide bandwidth.

Several current sensing techniques that cover a wide range of applications have been well documented. Broadly, shunt-based current sensors and those using magnetic fields to measure current are popular for AC/DC applications, while sensors utilizing electromagnetic induction are generally applicable to AC systems. Bandwidth, isolation, and signal conditioning are important considerations—shunt-based sensors have high bandwidth but no electrical isolation (example shown in FIG. 1). In contrast, magnetic and electromagnetic sensors are typically isolated, as shown in FIGS. 2 and 3 but may be restricted in bandwidth. Ideally, a current sensor that can measure AC as well as DC currents, with a wide bandwidth, in an isolated manner with minimal component count and customization would be a very valuable asset from a system monitoring point of view.

The sensors mentioned above are typically passive devices—unable to exert control actions or perform tasks like disconnecting an asset. As DERs proliferate into the grid, however, there is often a need for adding a layer of controllability into the DERs—typically at the point of interconnection. Many other sensors or grid assets like smart meters can also benefit from a control layer that can be embedded into them along with the sensing element. When situations like faults are to be mitigated, often it is necessary to disconnect and "break" the circuit to interrupt the power flow or to disconnect DERs from faulted lines. For example, many smart grid interconnection standards mandate DERs like PV inverters to be able to rapidly disconnect and island themselves from the grid under certain scenarios. For applications like multi-port power converters, the ability to measure power flowing in each port, with the added capability of disconnecting the line on demand can be significantly advantageous. A single device responsible for both functions can be very valuable, yet none seems to be readily available. Presently, none of the sensors discussed above have the inherent ability to disconnect the assets.

In general, some of the drawbacks observed with the prior art are described below. For measuring high currents (e.g., >100 Amps), a low resistance shunt can be preferred to limit the power dissipation in it. However, this can result in a very low voltage drop when measuring low currents (e.g., less than 10 Amps), which can lead to inaccurate measurements when measuring low current levels. Besides, when using a shunt-based current sensor, it may be desirable for the sensor to be galvanically isolated from the shunt element. Isolation amplifiers can achieve this, but they dictate the input characteristics of the signal being measured. This has a significant impact when measuring currents that produce very small voltage drops across the shunt element—a concern when using a low-resistance shunt element for measuring high currents. By way of example, for measuring 1-1000 A current, if a 25µΩ shunt is used, along with an isolated amplifier with an input offset voltage of 100 µV (typically observed value), this causes inaccuracies when measuring low currents (e.g., 1-10 A) that create voltage drops comparable to the offset voltage. On the other hand, the shunt resistor value should not be made too large as it creates large power losses in the shunt. In other words, the dynamic range of the measurement may be restricted by choice of the isolation amplifier and the shunt as they determine the range over which current can be measured accurately. Depending on the type of amplifier used, the isolated amplifier may also need an isolated power supply to bias the input stage of the amplifier, adding to costs and complexity.

Another issue is that magnetic field current sensors (e.g., Hall effect, Fluxgate, magneto resistance effect sensors, etc.) often are affected by environmental factors like temperature and stray magnetic fields and can need some complex signal conditioning and compensation techniques. An overcurrent through the conductor can disturb the pre-set calibration, and degaussing procedures may be needed to restore the sensor back to normal operation.

Likewise, sensors based on electromagnetic induction—like current transformers (CTs) or Rogowski coils—provide electrical/galvanic isolation, but they typically only measure AC or switched currents and cannot be used for DC current measurements. Examples are shown in FIG. 2.

Accordingly, there is a need for improved current sensors that address one or more of the issues discussed above.

BRIEF SUMMARY

An exemplary embodiment of the present disclosure provides a current sensor comprising a current input, a current output, a first current path between the current input and current output, and a second current path between the current input and the current output parallel to the first current path, a Rogowski coil current sensor, and a controller. The first current path can comprise a first switch. When the first switch is in a closed position, current can flow along the first current path between the current input and the current output. When the first switch is in the open position, current can be precluded from flowing along the first current path between the current input and the current output. The second current path can comprise a second switch. When the second switch is in a closed position, current can flow along the second current path between the current input and the current output. When the second switch is in the open position current can be precluded from flowing along the second current path between the current input and the current output. The Rogowski coil current sensor can have an aperture. At least one of the first current path and the second current path can pass through the aperture. The controller can be configured to control the first and second switches and to receive a current sensor signal from the Rogowski coil.

In any of the embodiments disclosed herein, the first and second switches comprise a semiconductor switch.

In any of the embodiments disclosed herein, the current sensor can be configured such that only one of the first and second current paths passes through the aperture of the Rogowski coil current sensor.

In any of the embodiments disclosed herein, the current sensor can be configured such that each of the first and second current paths passes through the aperture of the Rogowski coil current sensor.

In any of the embodiments disclosed herein, the first current path can form a loop such that when the first switch is closed, current passes along the first current path through the aperture in a first direction, and when the second switch is closed, current passes along the second current path through the aperture in a second direction opposite the first direction.

In any of the embodiments disclosed herein, the controller can be configured to operate in a connected state and a disconnected state, wherein in the disconnected state, the first and second switches are in an open position, and wherein in the connected state, at least one of the first and second switches are in a closed position.

In any of the embodiments disclosed herein, the controller can comprise a signal conditioning circuit configured to condition the current sensor signal from the Rogowski coil.

In any of the embodiments disclosed herein, the signal conditioning circuit can comprise: a front-end amplifier circuit configured to receive the current sensor signal from the Rogowski coil and generate an amplified current sensor signal; an integrator circuit configured to receive the amplified current sensor signal and generate an integrated current sensor signal; and a rectifier circuit configured to receive the integrated current sensor signal and generated a rectified current sensor signal.

In any of the embodiments disclosed herein, the signal conditioning circuit can further comprise a low-pass filter circuit configured to receive the rectified current sensor signal and generate a low-pass filtered current sensor signal.

In any of the embodiments disclosed herein, the controller can further comprise a microcontroller configured to receive an output of the signal conditioning circuit and generate a signal indicative of a current flow through the current sensor.

In any of the embodiments disclosed herein, the controller can further comprise a switching circuit configured to control the first and second switches.

In any of the embodiments disclosed herein, the signal conditioning circuit can further comprise an analog-to-digital converter configured convert the current sensor signal from an analog signal to a digital signal.

In any of the embodiments disclosed herein, the switching circuit can be configured to implement switching pattern that mimics a square wave.

Another embodiment of the present disclosure provides a current sensor comprising a current input, a current output, a first current path between the current input and current output, a second current path between the current input and the current output parallel to the first current path, a Rogowski coil current sensor having an aperture, and a controller. The first current path comprising a first resistor. The second current path can comprise a switch and a second resistor. When the switch is in a closed position, current can flow along the second current path between the current input and the current output, and when the switch is in the open position current is precluded from flowing along the second current path between the current input and the current output. The second resistor can be in series with the switch. The second current path can pass through the aperture. The controller can be configured to control the switch and to receive a current sensor signal from the Rogowski coil.

In any of the embodiments disclosed herein, the switch can have an on-state resistance, and wherein the second resistor can have a resistance of between 10 and 100 times the on-state resistance.

In any of the embodiments disclosed herein, the first resistor can have a temperature coefficient of resistance of less than 100 ppm.

In any of the embodiments disclosed herein, the second resistor can have a temperature coefficient of resistance of less than 100 ppm.

In any of the embodiments disclosed herein, the current sensor can further comprise at least one temperature sensor configured to measure one or more of an ambient temperature and a temperature of a location along one or more of the first and second current paths, and the controller can be further configured to account for variations in the one or more of the ambient temperature and the temperature of a location along one or more of the first and second current paths to measure a current passing through the Rogowski coil.

Another embodiment of the present disclosure provides a current sensor for sensing a current in a power converter. The power converter can have one or more legs. The one or more legs can have a current input, a current output, a first current path from the current input to the current output, the first current path comprising a first switch, and a second current path from the current input to the current output, the second current path comprising a second switch. The current sensor can comprise a Rogowski coil current sensor having an aperture. The first current path and the second current path can pass through the aperture. The Rogowski coil current sensor can be configured to transmit a signal indicative of a direct current flowing through the first and second current paths. The current sensor can further comprise a signal conditioning circuit configured to receive the signal from the Rogowski coil current sensor.

These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
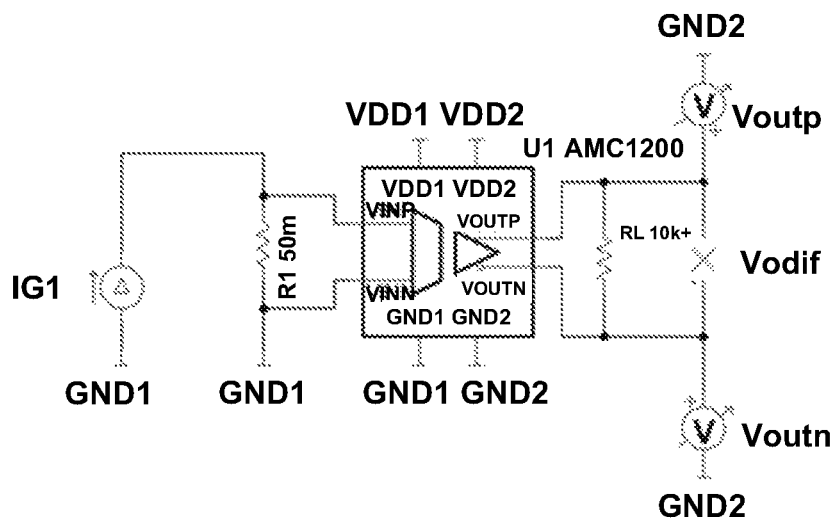
FIG. 1 provides a schematic diagram of a conventional current sensor.
Figure 2A:
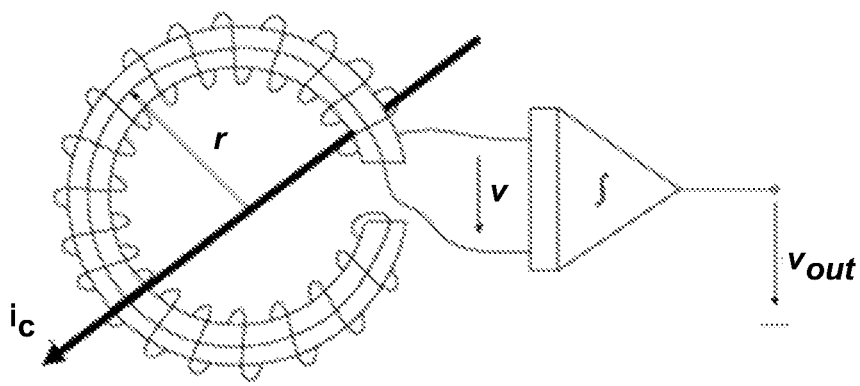
FIGS. 2A-B provide schematic diagrams of conventional current sensors.
Figure 2B:
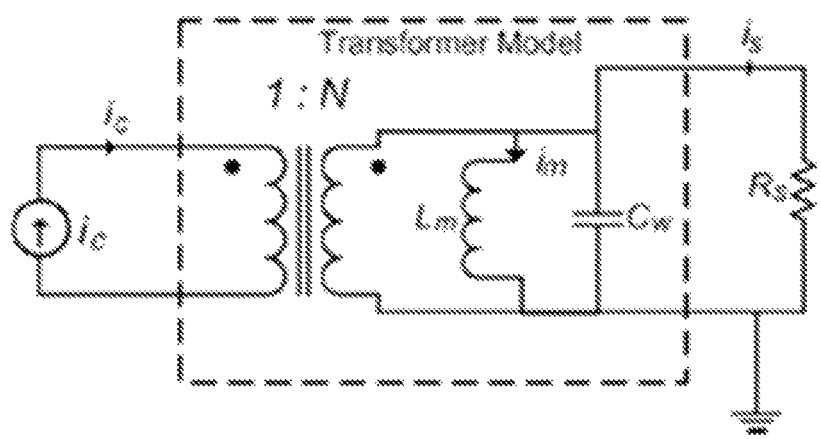
Figure 3A:
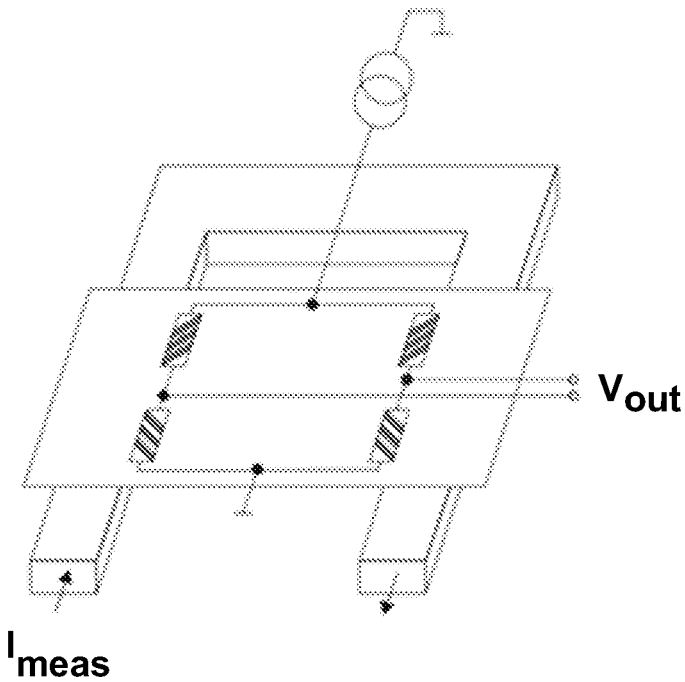
FIGS. 3A-B provide schematic diagrams of conventional current sensors.
Figure 3B:
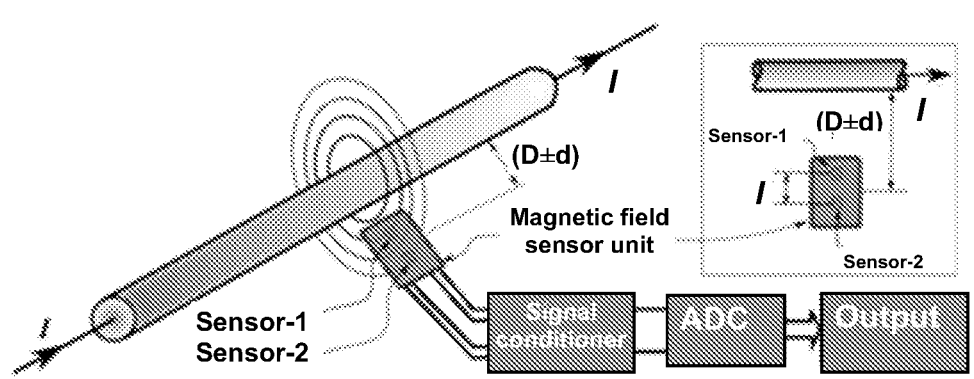

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Certain embodiments of the present disclosure make use of Rogowski coils. Rogowski coils are attractive for measuring AC, switched, or pulsed current as they can provide a wide dynamic measurement range, linearity across the complete range, and do not get saturated. With advances in high density interconnect (HDI) printed circuit boards (PCBs), it has become possible to miniaturize circuits and incorporate novel sensors and constructs into the PCB. Rogowski coils have been used for directly measuring AC currents for power grids or in applications where a switched current has to be measured (e.g., within a power converter). Rogowski coils operate based on Faraday's law of electromagnetic induction. The voltage induced at the output terminals of the Rogowski coil is proportional to the rate of change of current passing through the enclosed conductor. It is important to note that the Rogowski coils (or sensors based on Faraday's law of electromagnetic induction) do not work for DC current sensing, as they use alternating or pulsed currents with an inherent di/dt signal characteristic. On the other hand, Rogowski coils provide good noise immunity, electrical isolation and offer good sensitivity, especially when measuring high frequency AC or switched currents. For high frequency measurements, it is also possible to miniaturize the coils to small form factor, reducing the overall system size. Owing to the availability of fast operational amplifiers (op-amps) with precision trim and high bandwidth, an active integrator and analog signal conditioning circuit can be used to unpack the signal. The data can then be read by analog to digital converters and passed on to microprocessors. These data can be time-stamped and used for metering or monitoring purposes (e.g., an internet of things-based platform for monitoring energy devices).

Various embodiments of the present disclosure can combine switching elements along with a PCB-embedded Rogowski coil to measure AC as well as DC currents. Due to the nature of the circuits, the advantages of using a Rogowski coil can be maintained. The present disclosure makes it possible to create a current sensor by utilizing a combination of switching elements, a current shunt, and a Rogowski coil, to overcome one or more of the drawbacks outlined above. The advantage of using a Rogowski coil is that it provides isolation from the main current path, it typically has a wide bandwidth, and it can operate linearly across a wide range of operation. Even when measuring high currents, the coil does not saturate or cause distortions, but rather the signal conditioning and acquisition stage does.

As discussed above, various embodiments of the present disclosure can also employ switching elements. The switching elements can help convert any incoming AC/DC current waveform into a pulsed or a switched current waveform, while the Rogowski coil provides isolation while measuring the current. This step can utilize the benefits of the Rogowski coil by converting DC current to a switched current waveform, which can then be measured by the Rogowski coil, thus maintaining all its benefit. As disclosed below, the present disclosure provides different ways to realize this technique for various applications.

This disclosure provides current sensors with one or more of the following attributes: (1) the ability to make DC and AC current measurements without any change in design, which can ensure minimal customization of the sensor for matching the target application, wherein the configuration (e.g., matching the sensor to the type and range of current measurement) of the sensor can be done through software and external components like the current shunt; (2) the ability to provide galvanic isolation between the sensing circuit and the digital domain; (3) a wide dynamic range for current measurement, which can be made possible due to an adaptive signal stage used with the Rogowski coil, to ensure that the current being measured matches to the full-scale range of the signal acquisition stage of the sensor; (4) the ability to disconnect loads based on a control input; (5) and the ability to be integrated with monitoring systems capable of recording time-stamped data.

Figure 4A:
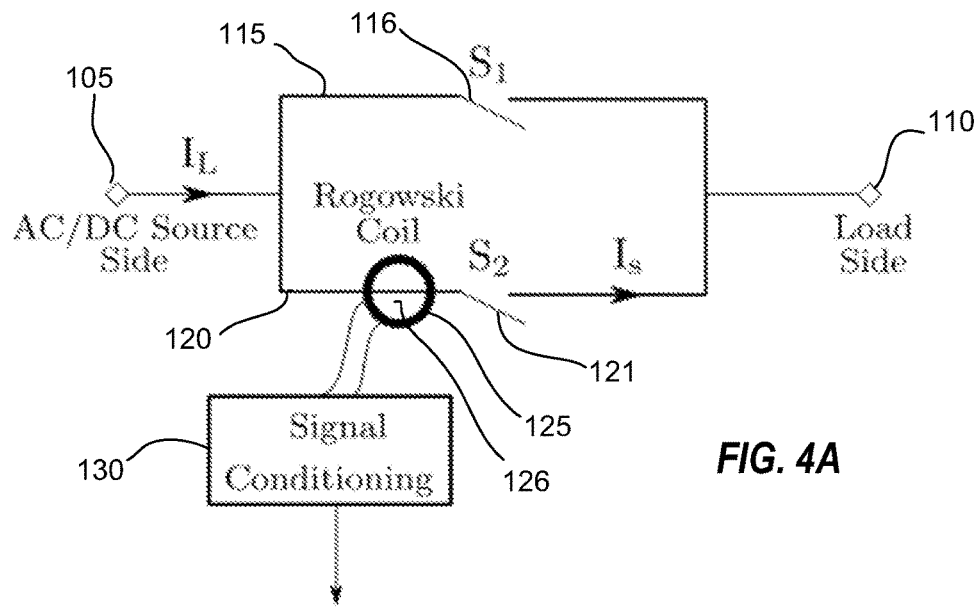
FIG. 4A provides a schematic diagram of a current sensor, in accordance with some exemplary embodiments of the present disclosure.

FIG. 4A provides an exemplary embodiment of a current sensor comprising a current input 105, a current output 110, a first current path 115 between the current input 105 and current output 110, and a second current path 120 between the current input 105 and the current output 110 parallel to the first current path 115. The current sensor can measure the current flowing from the current input 105 to the current output 110 (and to a load). Each of the first current path 115 and second current path 120 can comprise a switch 116 and 121, respectively. The switches 116, 121 can allow or prohibit current to flow through the respective current paths. Thus, when the first switch 116 is in a closed position, current can flow along the first current path 115 between the current input 105 and the current output 110. When the first switch 116 is in the open position, current can be precluded from flowing along the first current path 115 between the current input 105 and the current output 110. Similarly, when the second switch 121 is in a closed position, current can flow along the second current path 120 between the current input 105 and the current output 110. When the second switch 121 is in the open position current can be precluded from flowing along the second current path 120 between the current input 105 and the current output 110. Thus, the current sensor can function as a shunt and stop current from flowing to the load by opening both the first 116 and second 121 switches. Similarly, the current sensor can ensure current is continuously flowing to the load so long as at least one of the first 116 and second 121 switches are in the closed position.

Though the sensor shown in FIG. 4A includes two current paths 115, 120, the disclosure is not so limited. Rather, some embodiments can include more than two current paths.

Figure 4B:
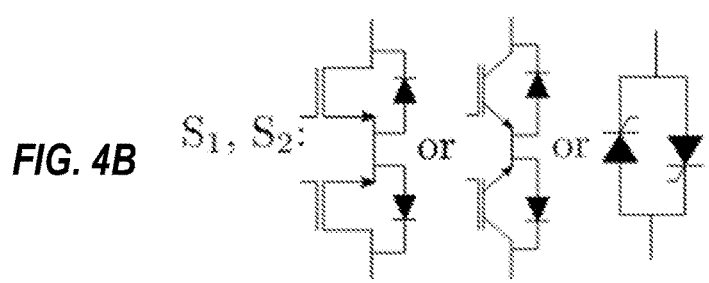
FIG. 4B provides schematic diagrams of exemplary semiconductor switches that can be used in current sensors of the present disclosure.

The switches 116 and 121 can be many switches known in the art. In some embodiments, the switches 116 and 121 can be semiconductor switches, including, but not limited to, metal-oxide-semiconductor field-effect-transistors (MOSFETs), bipolar junction transistors (Bites), insulated gate bipolar transistors (IGBTs), thyristors, and the like. FIG. 4B provides schematic for multiple switches that can be used.

As shown in FIG. 4A, the current sensor can further comprise a Rogowski coil current sensor 125. The Rogowski coil current sensor 125 can have an aperture 126. At least one of the first current path 115 and the second current path 120 can pass through the aperture 126. In some embodiments the current sensor can be provided in the form of a printed circuit board ("PCB"), and the Rogowski coil current sensor 125 can be embedded in the PCB. Though not shown in FIG. 4A, in some embodiments, the current sensor can comprise multiple Rogowski coil current sensors. These coils can enclose single or multiple current-carrying paths 115, 120 that result from the switches 116, 121 turning ON and OFF in succession. The Rogowski coil 126, embedded into the PCB, encloses one or more of the conducting paths, by allowing the one or more paths to pass through the aperture 126. The coil 125 can produce a waveform that is proportional to the di/dt of the current passing through it.

Figures 6A, 6B:
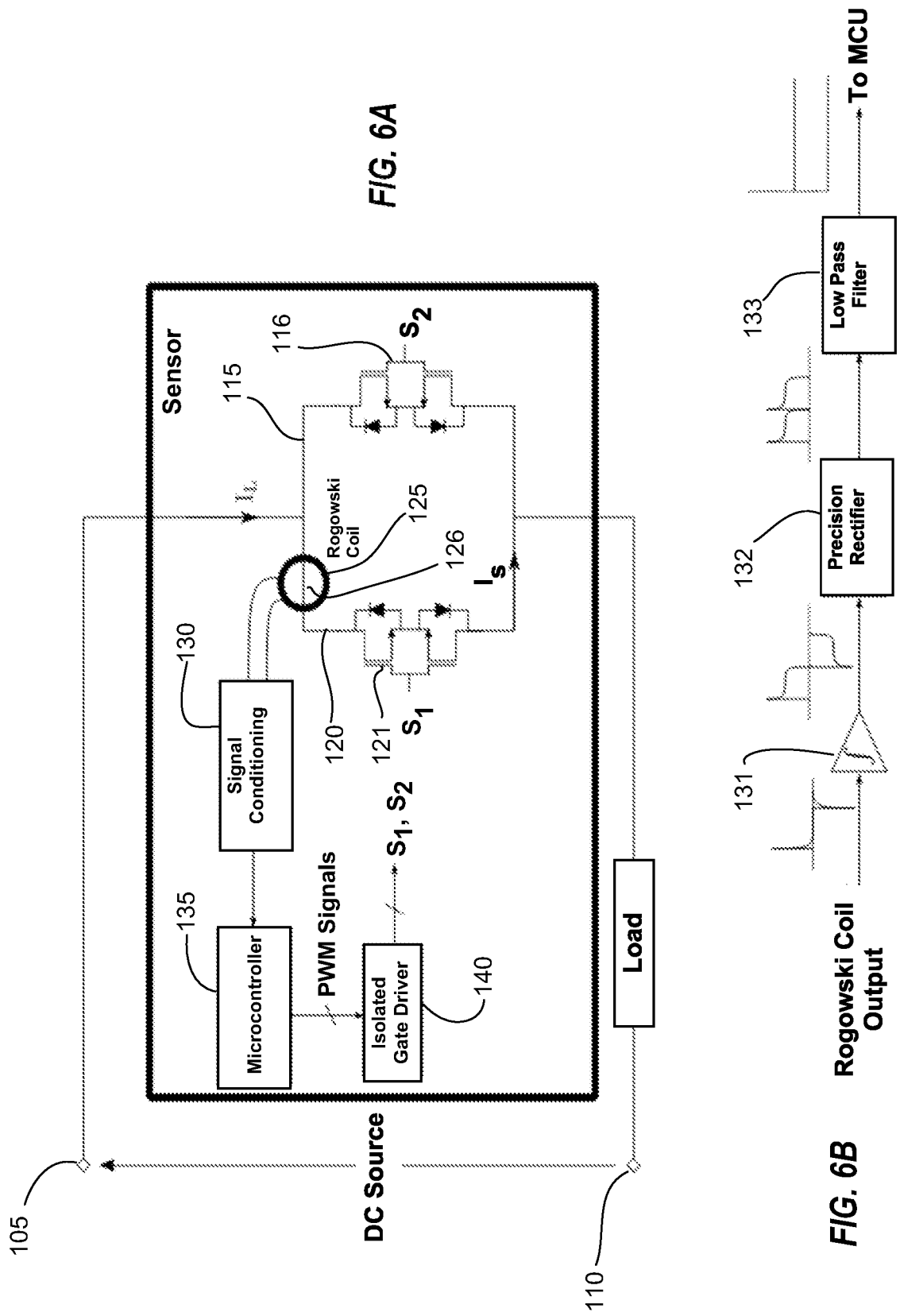
FIGS. 6A-B provide schematic diagrams of a current sensor and signal conditioning circuit, respectively, in accordance with some exemplary embodiments of the present disclosure.
Figure 15B:
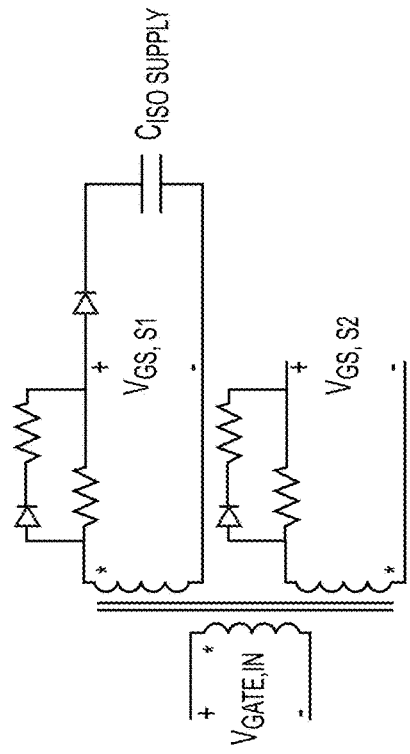
FIGS. 15A-C provides schematics of a current sensor, gate driving circuit, and signal conditioning circuit, respectively, in accordance with some exemplary embodiments of the present disclosure.
Figure 15A:
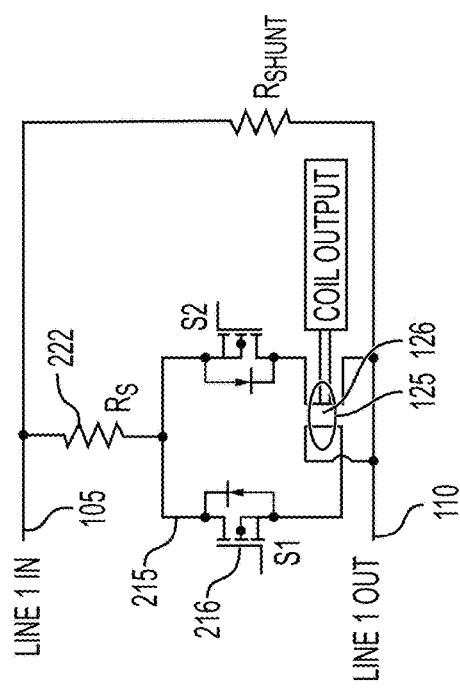
Figure 15C:
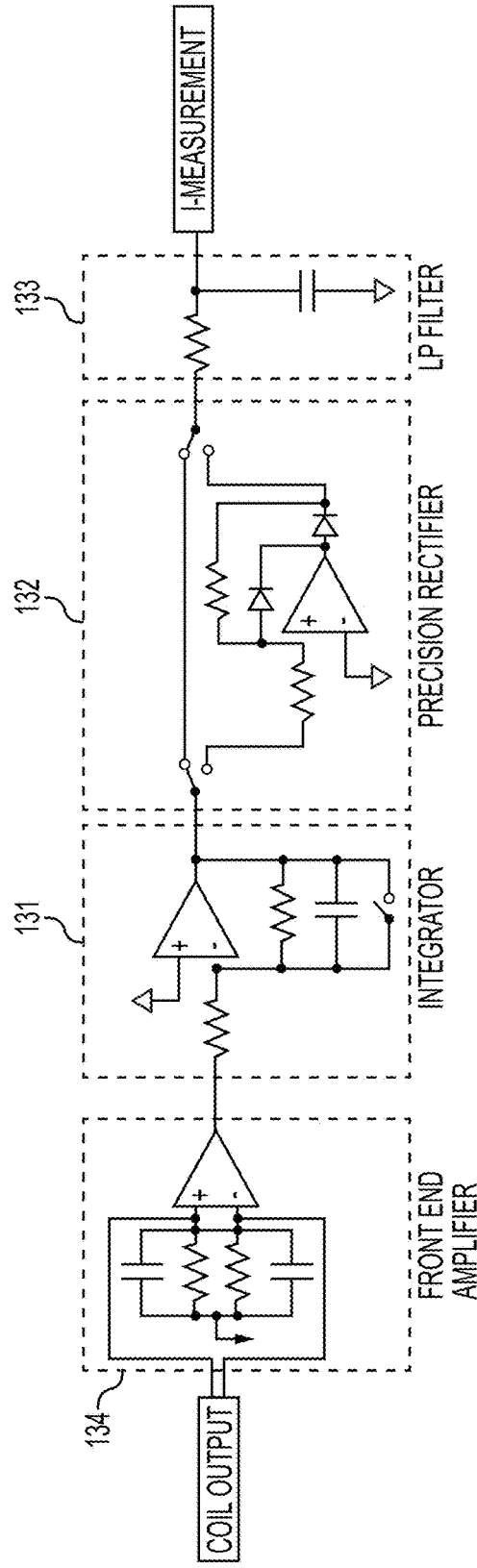

As shown in FIG. 4A, the current sensor can further comprise a signal condition circuit 130, which can receive a signal generated by the Rogowski coil 125 and reconstruct the original waveform. As shown in FIG. 6B, the signal conditioning circuit can comprise an integrator 131, precision rectifier 132, and/or filters 133. Further, though not shown in FIG. 6B, the signal conditioning circuit can also comprise one or more amplifiers as shown in FIG. 15C, which provides a schematic for a signal conditioning circuit, including circuit schematics for individual components thereof. For example, an amplifier 134 can amplify the output of the Rogowski coil 125 prior to passing the signal to the integrator 131.

Figure 5:
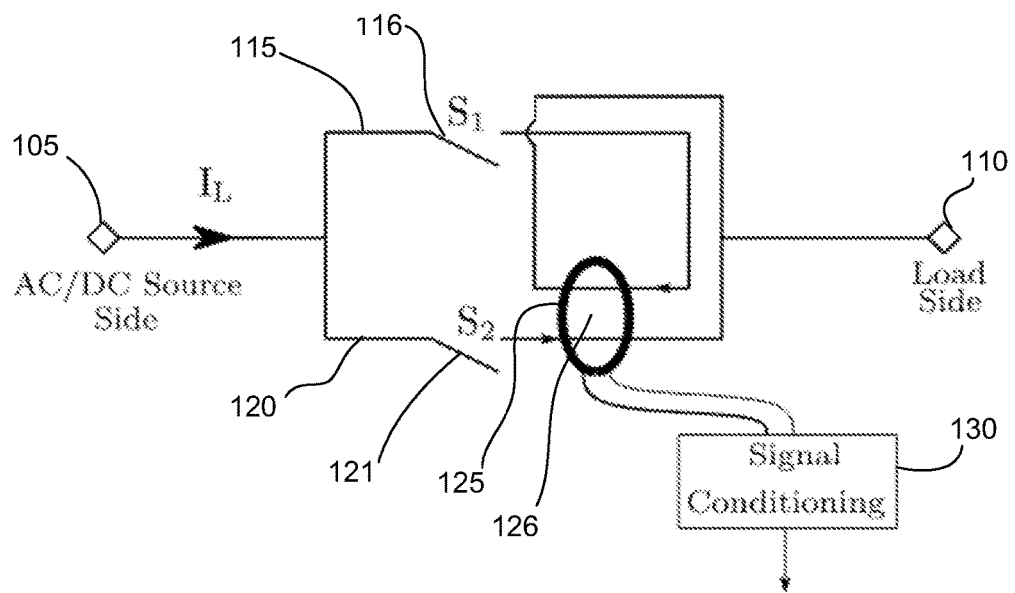
FIG. 5 provides a schematic diagram of a current sensor, in accordance with some exemplary embodiments of the present disclosure.

As shown in FIG. 5, It is possible to have the same Rogowski coil 125 capture the currents flowing through both the switches 116, 121 by looping the current carrying conductor according to the polarity of the current direction. This allows the sensor to capture both the cycles of switching current and increases the fidelity and bandwidth of the reconstructed current waveform.

As shown in FIG. 6A, the current sensor can further comprise a controller 135. The controller can receive and process the output of the signal conditioning circuit 130 to measure the current flowing through the current sensor. The controller 135 can also comprise a gate driving circuit 140 that can control the first 116 and second 121 switches and to receive a current sensor signal from the Rogowski coil (e.g., via the signal conditioning circuit 130).

Figure 7:
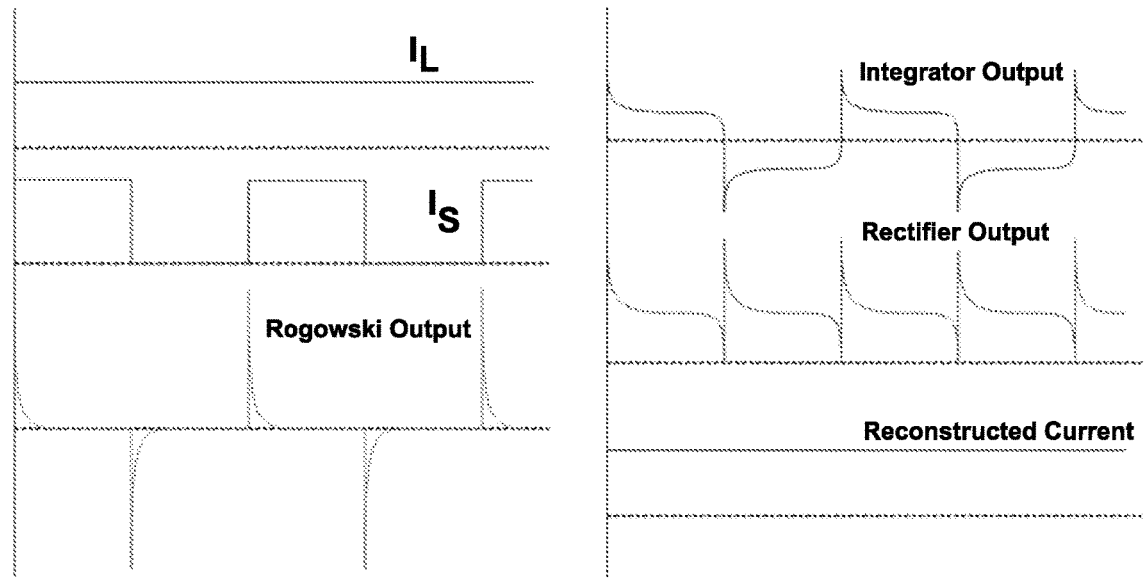
FIG. 7 provides plots of signals at different stages of the current sensor shown in FIG. 4A when DC load current is flowing through the current sensor.

Operation of the signal conditioning circuit 130 will now be described, in accordance with some embodiments of the present disclosure. Consider a scenario where the sensor implementation shown in FIGS. 6A-B is used for sensing a DC load current ($I_L$). FIG. 7 shows the signals at the various stages for the sensor circuit. As a result of a proper gating arrangement, a chopped current ($I_S$) is made to pass through each of the current paths 115, 120 of the sensor. While switching, the gate signals can be applied to the MOSFETs in the sensor to ensure that the load current is uninterrupted (i.e., each MOSFET is switched in a "make-before-break" fashion, one of the possible implementations shown in FIG. 7). The output of the Rogowski coil ($dI_s/dt$) comprises a spike-train, as seen in FIG. 7. The peak value and the duration of the spike can depend upon the current flowing through the branch and the coil parameters (like mutual inductance, sensitivity, etc.). In order to re-create the original switched waveform, the differentiated waveform can be passed through an integration stage—typically analog, but digital integration may be possible through micro-processor algorithms as well. Depending on the integrator stage design, the integration of the spiked waveform results in a signal shown in FIG. 7. In some cases, to overcome the offset and drift produced by the integrator stage, the integrator can be reset by using a switch or an equivalent component. It is possible to reset the integrator stage during the zero (or negative) waveform transition since the gating signal and hence the zero (or negative) transitions are known. This waveform can be further used for obtaining reconstructing the switched waveform. In one example, the integrator output is rectified using precision rectifier and passed through a low pass filter to extract the actual information as seen in FIG. 7. In this case, the reconstructed waveform is representative of the actual DC current waveform $I_L$ passing through the entire sensor.

Figure 8:
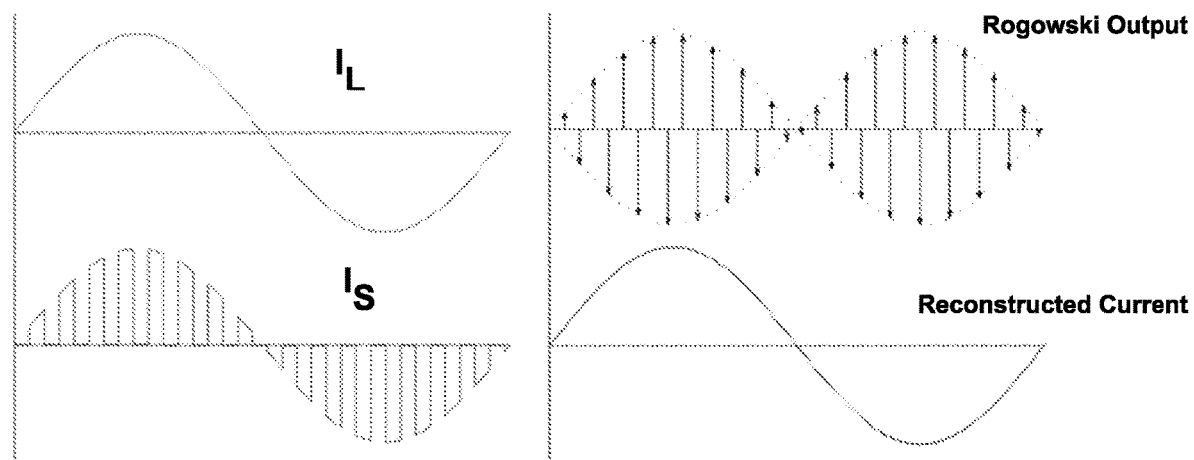
FIG. 8 provides plots of signals at different stages of the current sensor shown in FIG. 4A when AC load current is flowing through the current sensor.
Figure 9A:
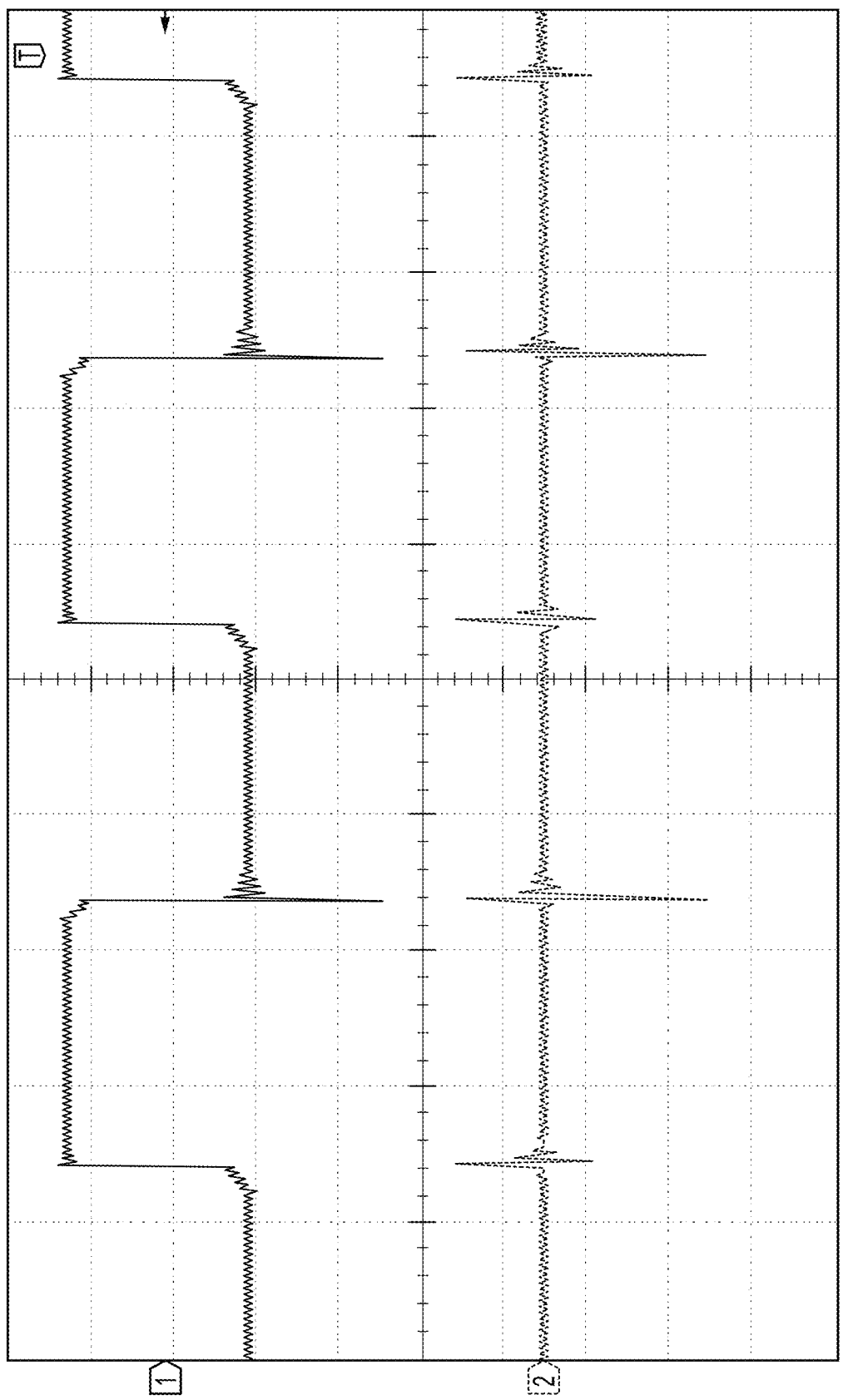
FIGS. 9A-D provide plots of signals at different stages of the current sensor shown in FIGS. 6A-B when DC load current is flowing through the current sensor.
Figure 9B:
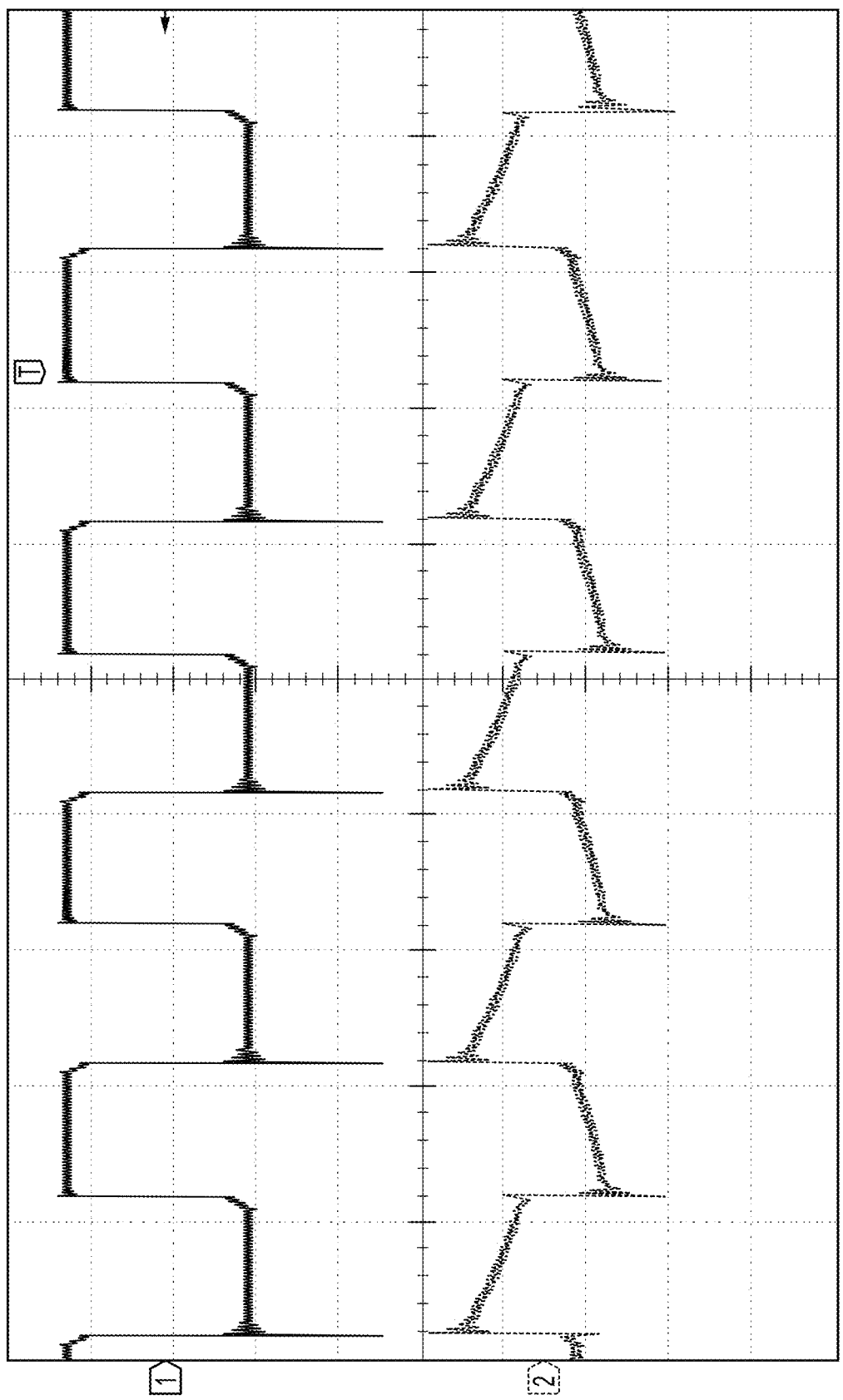
Figure 9C:
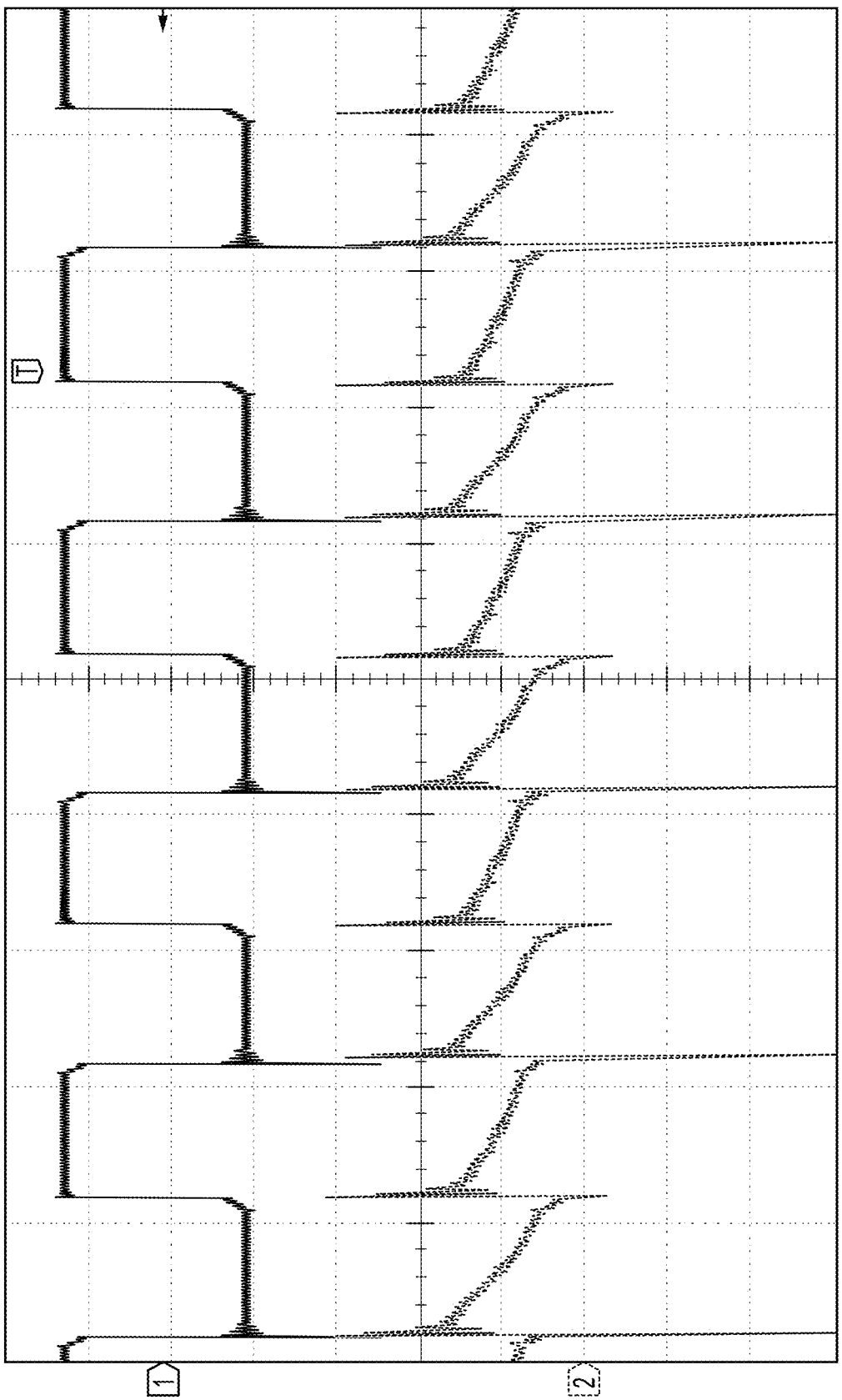
Figure 9D:
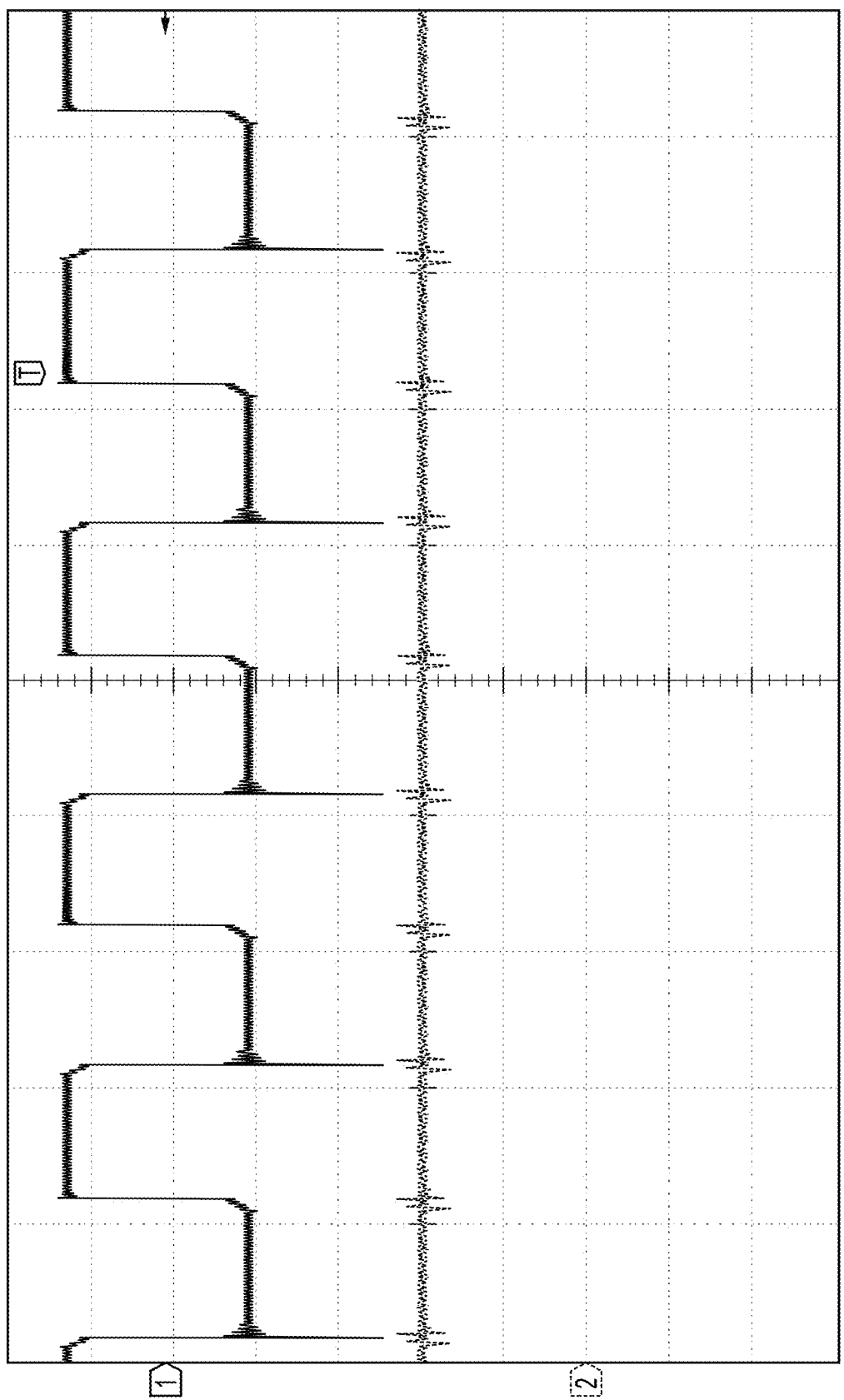

FIG. 8 shows the signals at various stages of the circuit when the sensor pictured in FIG. 4A is used for sensing an AC current. Due to the switching action, a chopped sine wave will pass through each of the legs of the sensor. The pulse train shown in FIG. 8 would be generated at the output of the Rogowski coil. The signal conditioning circuit 130 in conjunction with the microcontroller 135 may be used to reconstruct the actual current from the spike waveform.

Some preliminary tests were conducted to present the working of the sensor shown in FIG. 9 using an experimental prototype. The sensing series element is inserted in the circuit with a DC voltage source and a load resistor. An uninterrupted flow of current through the circuit is ensured using an appropriate gating scheme. The square wave seen in the results is the current passing through one of the paths. FIG. 9A shows the Rogowski coil output, FIG. 9B shows the integrated signal, FIG. 9C shows the output of the precision rectifier, and FIG. 9D shows the low pass filter output.

In some embodiments of the present disclosure, a combination of current shunt and semiconductor switches can be used in applications where a disconnect capability is not required, especially when high accuracy at high currents is essential. Few embodiments of the same are shown in FIGS. 10A-B, 11, and 14.

Figure 10A:
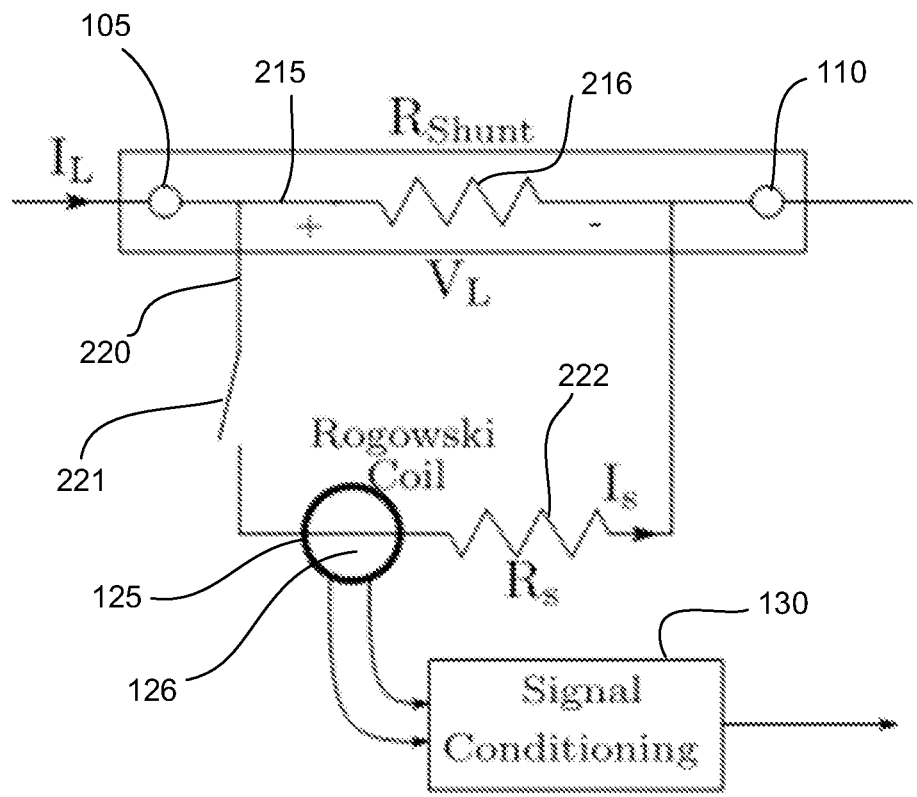
FIGS. 10A-B provide schematic diagrams of current sensors, in accordance with some exemplary embodiments of the present disclosure.

For example, as shown in FIG. 10A, another embodiment of the present disclosure provides a current sensor comprising a current input 105, a current output 110, a first current path 215 between the current input 105 and current output 110, a second current path 220 between the current input 105 and the current output 110 parallel to the first current path 215, a Rogowski coil current sensor 125 having an aperture 126, and a signal conditioning circuit 130. The first current path 215 can a first resistor 216 (shunt resistor). The second current path 220 can comprise a switch 221 and a second resistor 222. When the switch 221 is in a closed position, current can flow along the second current path 220 between the current input 105 and the current output 110, and when the switch 221 is in the open position current is precluded from flowing along the second current path 220 between the current input 105 and the current output 110. The second resistor 222 can be in series with the switch 221. The second current path 220 can pass through the aperture 126. The signal conditioning circuit 130 can be configured to receive the output from the Rogowski coil current sensor 125.

Figure 10B:
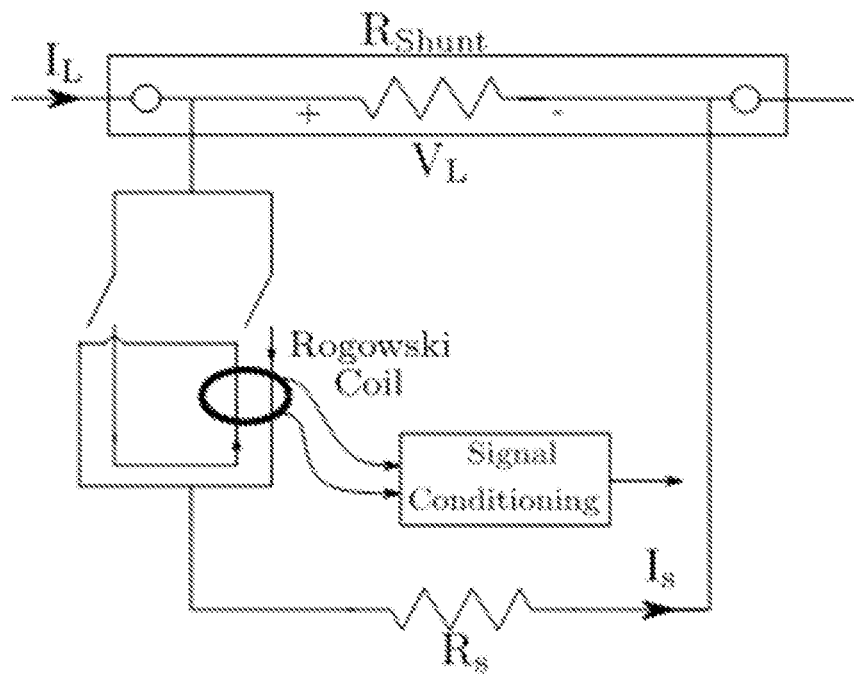

The embodiments shown in FIGS. 10A-B can have the following features. First, the sensors can include a current shunt that can be sized as per the current range of interest and plugged into the signal conditioning stage through a set of kelvin connections, making the sensor modular in nature. The current shunt can be inserted in series with the current flowing in the conductor, creating a voltage drop proportional to the current. Second, the voltage drop formed across the shunt resistor can be impressed on another set of resistors with the help of a set of semiconductor switches (e.g., MOSFETs). This can form a low current path with current flowing from the shunt resistor to the set of load resistors, as per the state of the semiconductor switches. The semiconductor switches can be turned ON and OFF according to a pre-defined pulse-width modulation strategy that controls the envelope of the current passing through the low current paths. Third, the sensors can host a PCB-embedded Rogowski coil 125, and the low-current paths mentioned above can be looped through the Rogowski coil 125. Thus, the Rogowski coil produces an output proportional to the di/dt of the current enclosed in it. When passed through a signal conditioning stage, this signal can be used to reconstruct the original low current waveform passing through the Rogowski coil, thus acting as a proxy for measurement for the original current passing through the shunt resistor.

The load resistance $R_s$ shown in FIGS. 10A-B can be chosen to set the current $I_L$ flowing through the low current path. For ensuring that the current $I_s$ flowing in the switched path (or paths) 220 does not vary with the switch's 221 characteristics (e.g., variation of the on-state resistance(s) of switch(es)), the value of $R_s$ chosen should be 50-100× of the on-state resistance of the semiconductor switch 221. Generally, when using current shunts as the sensing element, it can be beneficial to utilize precision resistors that have a low temperature coefficient of resistance ("TCR"), i.e., their resistance does not change with temperature. Typical values of TCR<100 ppm are usually preferred. For realizing a highly accurate current measurement system, it can be beneficial to choose precision components in the low-current path as well, ensuring that the overall system parameters do not vary with respect to the ambient temperature. This can be achieved by balancing the TCR of all semiconductor switches with the TCR of the resistive elements, such that the overall TCR is minimized. A feedback element in the form of a temperature sensor can also be used to compensate for any measured temperature variation.

Figure 11A:
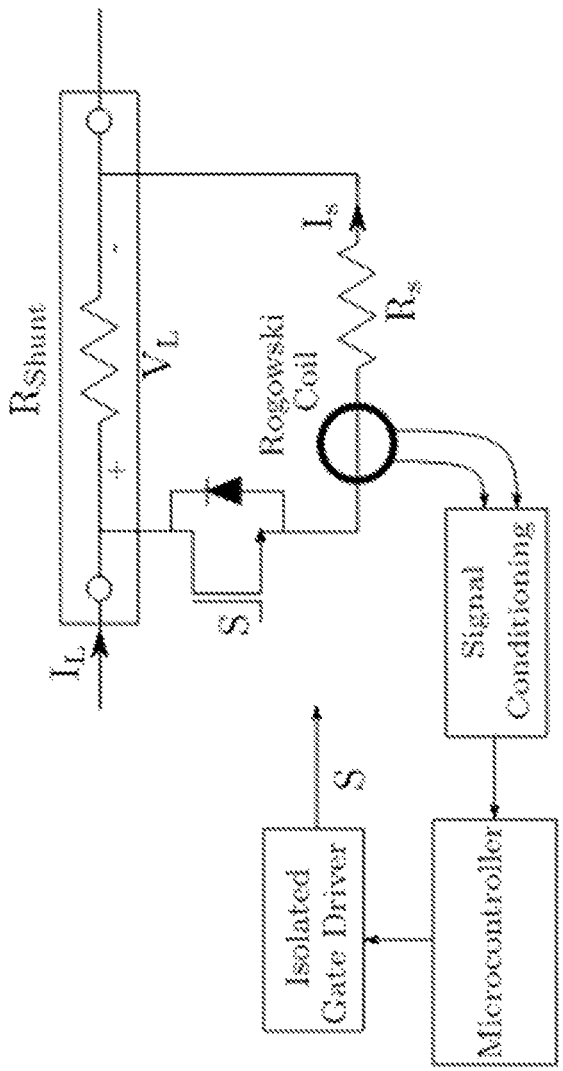
FIGS. 11A-B provide schematic diagrams of a current sensor and signal conditioning circuit, respectively, in accordance with some exemplary embodiments of the present disclosure.
Figure 11B:
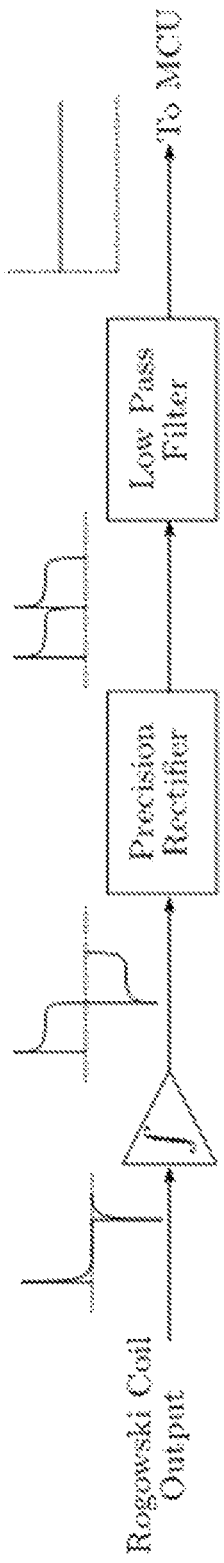
Figure 12:
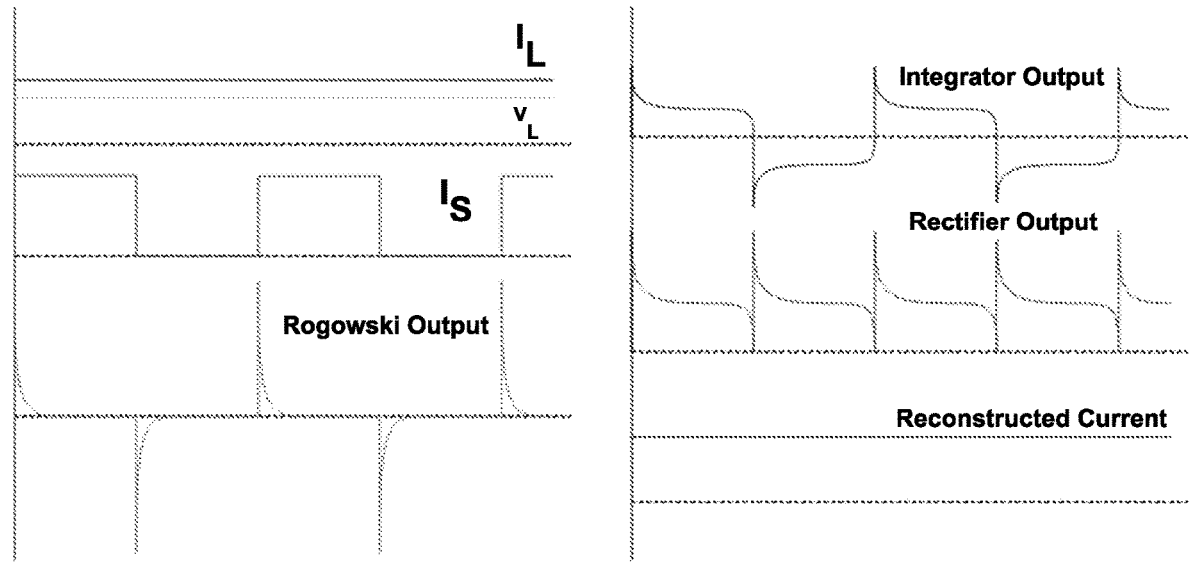
FIG. 12 provides plots of signals at different stages of the current sensor shown in FIGS. 11A-B when DC load current is flowing through the current sensor.
Figure 14:
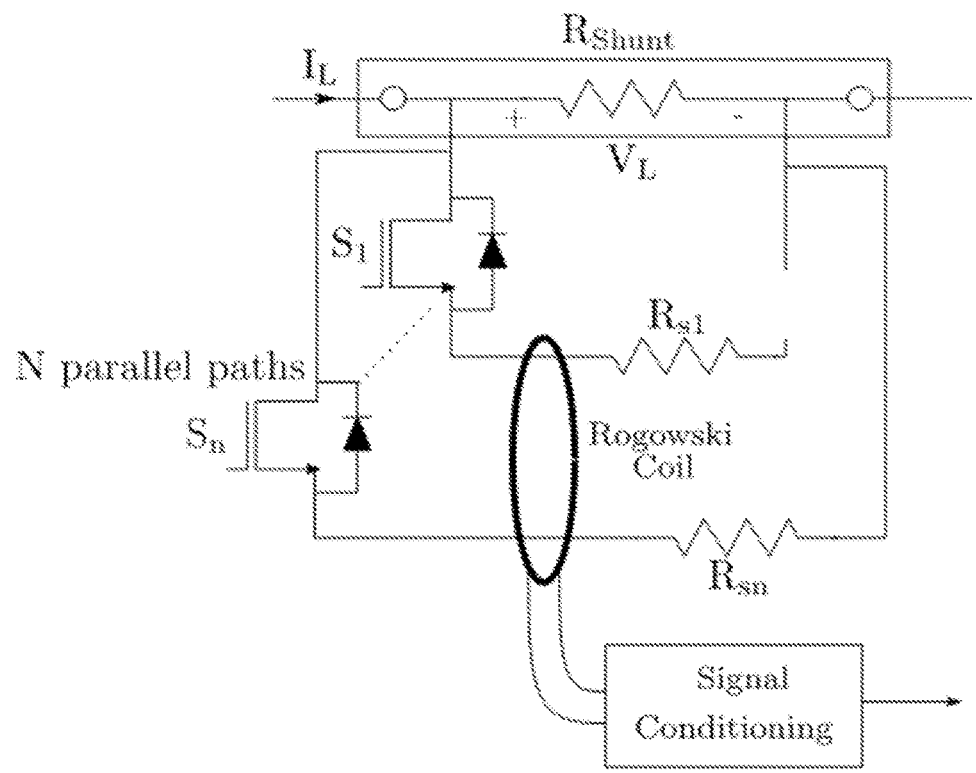
FIG. 14 provides a schematic diagram of a current sensor, in accordance with some exemplary embodiments of the present disclosure.

As an example, consider FIGS. 11A-B as an embodiment of the sensor described above, utilizing N-channel MOSFETs as the switches and a $R_{Shunt}=25$ μΩ shunt resistance. Assume the sensor is utilized for measuring currents from 1 to 1,000 A. Consider the case where the MOSFET has an on-state resistance $R_{DS(ON)}=25$ mΩ and a series resistance of 1Ω. When the MOSFET is turned on, it impresses the $V_L=25$ mV drop from the shunt resistance onto the combination of 1.025Ω equivalent resistance, generating ~25 mA of switched current flowing through the Rogowski coil. The Rogowski coil, along with the signal conditioning circuit is able to reconstruct the switched current waveform, which can be digitized and used to reconstruct the original 1,000 A DC current flowing in the shunt resistance.

On the lower end, when 1 A current flows through a 25 μΩ shunt, producing $V_L=25$ μV drop, the same system produces a current of 25 μA flowing through the Rogowski coil. For measuring this current, the system would need sufficient dynamic range to cover more than 1:1,000 range of measurements. This is possible through the adaptive signal conditioning stage disclosed in PCT Patent App. No. PCT/US2020/044007 (publication no. WO/2021/021889), which is incorporated herein by reference in its entirety as if fully set forth below. With this stage and the method called dynamic range correction (DRC), it is possible to control the signal conditioning circuit through the micro-processor general purpose input/output pins (GPIOs) to ensure that the signal conditioning stage does not get saturated when amplifying and reconstructing the signal. The gains of different stages (e.g., Front-end amplifier, integrator, etc.) can be modulated according to the waveform being conditioned. This ensures that the signal conditioning stage does not get saturated and distorts the signal and ensures that the signal maps to the full-scale range of the data acquisition stage.

Consider a case where the sensor in FIGS. 11A-B is used for sensing a DC current $I_L$. A voltage drop ($V_L$) proportional to the current passing through the shunt causes a flow of current in the sensor circuit. An uninterrupted path for current is not necessary here. The peak value of the current depends mainly on the value of sense resistor ($R_L$). The switched current waveform can generate a spiked signal, which can be integrated using the integrator circuit followed by a rectification. The filtered output can be read by the MCU and compensated with the calibration data, stored in MCU to get the actual current measurement.

It can be seen that the same sensor can be used for measuring DC current that flows in the reverse direction as well, as the MOSFETs can conduct in both directions provided the gate to source voltage is higher than the turn-on voltage threshold. The body diode of the MOSFET does not conduct when the MOSFET is turned off, as the voltage impressed on it (25 mV) is not enough to forward bias it and start conducting. In cases where the components are sized such that the voltage may be able to forward bias the diode so that it starts conducting, any reverse blocking switch configuration like back-to-back connected MOSFETs with a common source (e.g., the switches $S_1$ 116 and $S_2$ 121 shown in FIG. 4A-B) may be used. It is evident that if the sensor can be used for the measurement of DC current flowing in both directions, then the same sensor can be used for measuring AC current as well. In the AC sensor application, the integration bandwidth may usually cover the 60 Hz component as well in order to reconstruct the full waveform being measured.

Figure 13A:
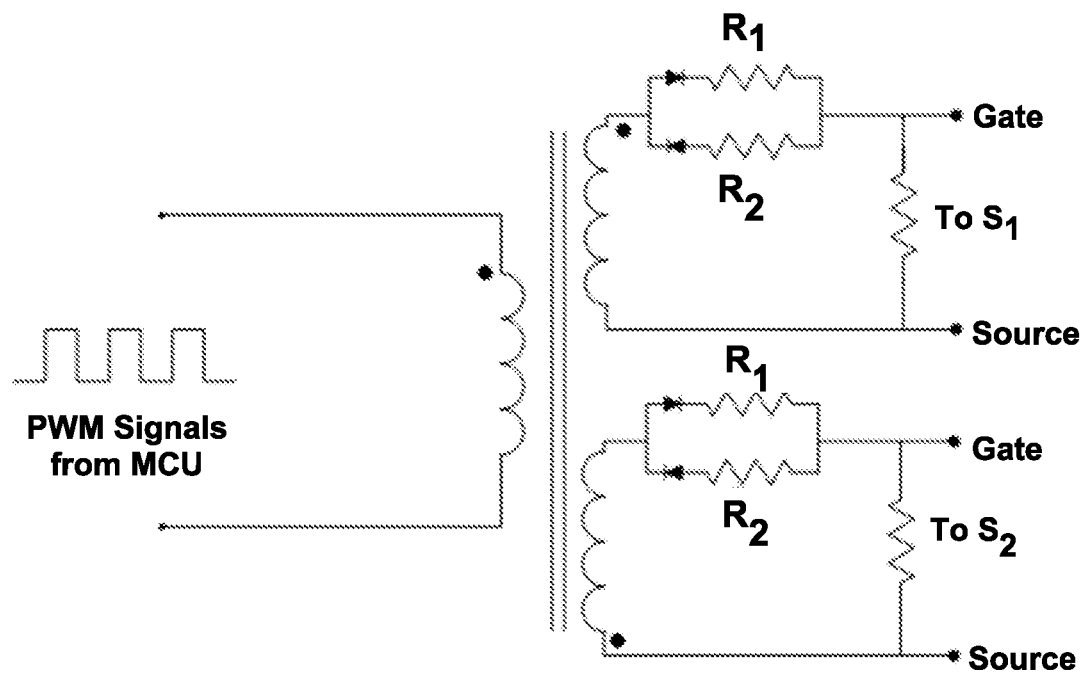
FIGS. 13A-B provide schematic diagrams of gate driving circuits, in accordance with some embodiments of the present disclosure.
Figure 13B:
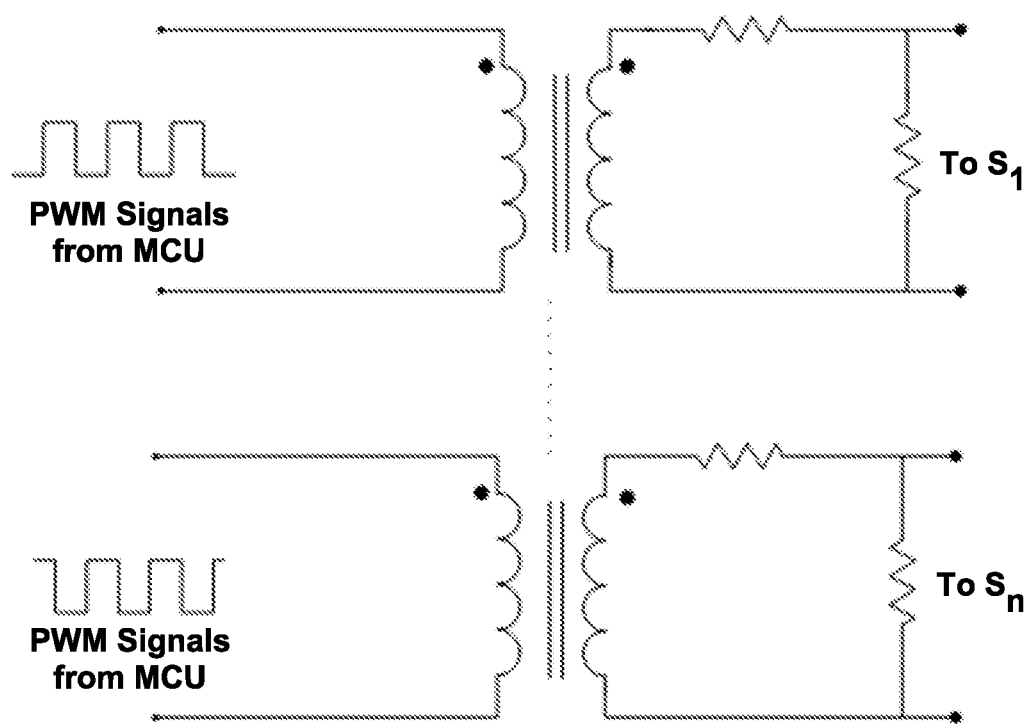

The gating signals for the switches can be generated using a digital microcontroller unit (MCU) 135 or a dedicated analog/timer circuit. The gating circuit 140 can be isolated from the power circuit through galvanic, optical, capacitive isolation circuits, etc. (like the schemes in FIGS. 13A-B). An exemplary switching frequency for this circuit can be around 10-50 kHz but can be changed as per the application and design parameters. The sensitivity of a given Rogowski coil can be directly proportional to the frequency of the switched current passing through it, i.e., with higher switching frequencies, the Rogowski coil's sensitivity can increase. Depending on the number of switches and current paths being generated in the circuit, a gating scheme can be developed so that the combination of the resulting currents flowing through the Rogowski coil can provide maximum information while reconstructing the original voltage drop (and consequently the current of interest flowing through the main conducting path). For instance, in the case of two switches such as those shown in FIGS. 4A and 5, the switches can be turned on and off such that their operation is complementary to each other with a pre-determined overlap as needed to mitigate the current path. The first approach (FIG. 13A) achieves the "make-before-break" using a high frequency three-winding transformer and combination of diodes and resistors. A single gating signal can be generated by the MCU. Ideally, in order to achieve turn ON of the other leg before turning OFF the other, the turn ON time should be negligible and the turn OFF time should be higher. The same thing may also be achieved using more (two in this context) signals from the MCU and a separate isolated transformer for each gate signal. Other isolation techniques like optical isolation or capacitive isolation for the gate signals may be equally utilized.

In general, the switching action creates a current waveform with a square shape, which is then differentiated (di/dt) by the Rogowski coil. The coil's output being noisy in nature can be filtered to remove any common mode and differential noise from the signal. The differentiated form of the square wave can be then passed on to the integrator stage. The integrator is designed using low-offset precision op-amps. The integrator and signal conditioning stage can have high bandwidth and low noise output so that the important information from the differentiated signal is not attenuated or corrupted. When measuring a switched current waveform, in order to minimize the offset-induced drift of the integrator, the integrator can be periodically 'reset' by using a switch in the feedback path. The switch can be turned on to reset the integrator to the zero stage when the current passing through the Rogowski coil is zero, i.e., during certain pre-determined intervals ensured by the gating sequence. E.g., when the overlap period occurs for the sensor in FIG. 5, the current through the coil is zero. For sensor in FIGS. 10A-B, the resetting can be performed when the switch is open. The integrator can be reset during that time. This can minimize the integrator drift over time. To retrieve the information about the actual signal, the integrated output can then be passed through a signal conditioning stage. The output from the signal conditioning block can then be processed using some calibration gains using a digital microcontroller or some analog circuit arrangement. Due to the decreasing cost of semiconductor chips and ICs, a microcontroller may be preferred for storing the calibration gains. Usage of a microcontroller in the post processing stage can provide more flexibility in terms of functionality. The same microcontroller can be used for generating the gate signals for triggering the devices used in the sensor. The microcontroller can be easily interfaced with monitoring and analytics systems.

Figure 16:
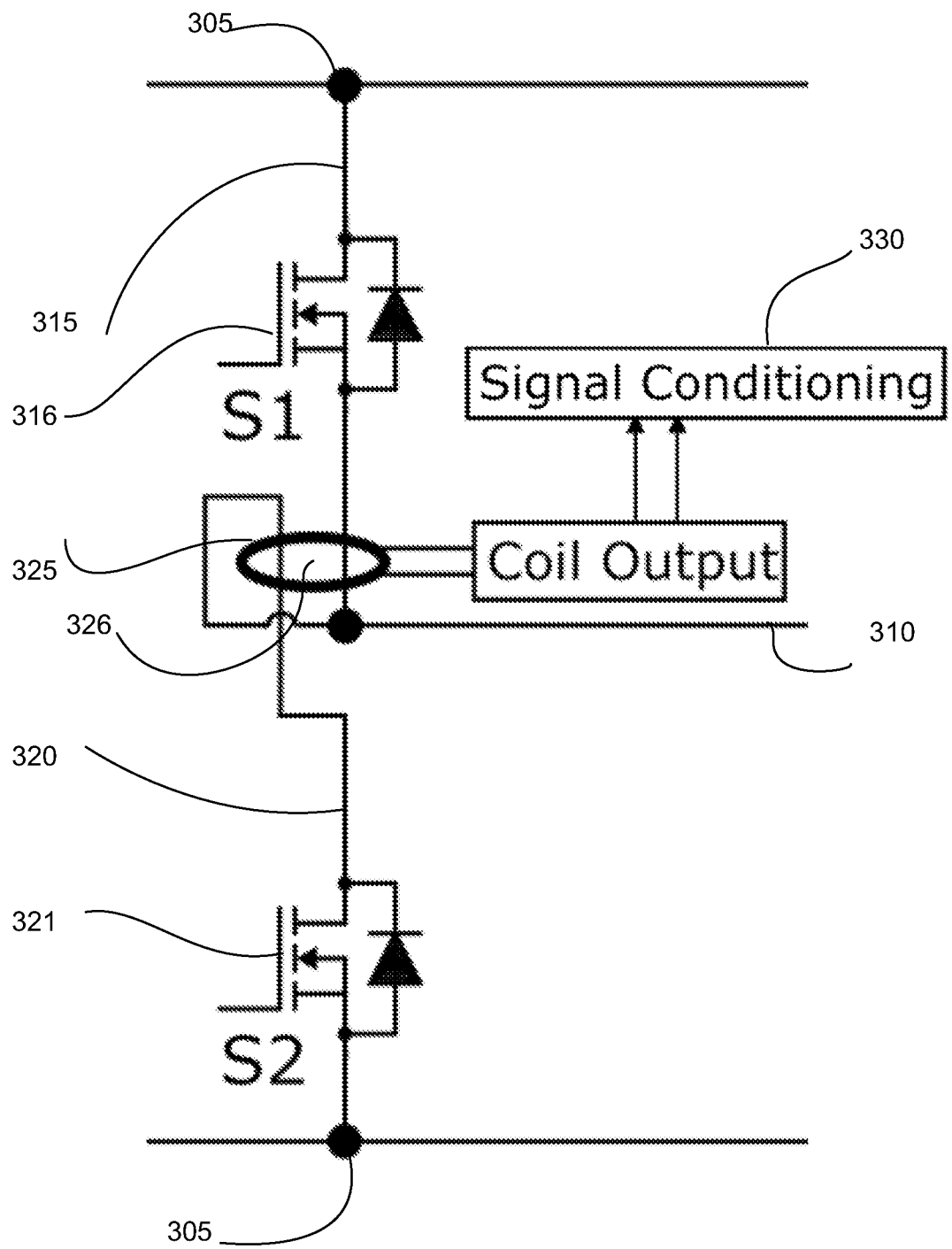
FIG. 16 provide a schematic of a current sensor for sensing output current of a leg of a power converter, in accordance with some exemplary embodiments of the present disclosure.

As shown in FIG. 16, another embodiment of the present disclosure provides a current sensor for use in measuring a current flowing through a power converter. Such current power are well known in the art. An exemplary power converter is disclosed in PCT Patent Application Publication No. WO2021/041465, entitled "Soft-Switching Current Source Inverters," which is incorporated herein by reference in its entirety as if fully set forth below. As persons skilled in the art would appreciate, power converters can have multiple legs, which can allow power to flow through a transformer. As shown in FIG. 16, each of the legs can have a current input 305 (as shown in FIG. 16, the current input 305 can have a positive and negative input) and a current output 310. A first current path 315 can allow current to flow from the input 305 (e.g., the positive input at the top of FIG. 16) to the output 310 through a first switch 316. A second current path 320 can allow current to flow from the input 305 (e.g., the negative input at the bottom of FIG. 16) to the output 310 through a second switch. As persons skilled in the art would appreciate, typical operation of such a power converter would ensure that only one of the first and second switches is closed at any given time such that current flows through only one of the first 315 and second 320 current paths at any given time. The current sensor can comprise a Rogowski coil current sensor 325 having an aperture 326 (as discussed above). The first 315 and second 320 current paths can pass through the aperture 326, such that a direct current passing through the aperture causes the Rogowski coil current sensor 325 to generate a signal indicative of the direct current. The current sensor can further comprise a signal conditioning circuit 330 configured to receive the output signal from the Rogowski coil current sensor 325. The signal conditioning circuit 130 can function in the same ways and can comprise the same components as the other signal conditioning circuits disclosed herein (e.g., 130). As also shown in FIG. 16, the second current path 320 can form a loop such that current flows along the second current path through the aperture in a direction opposite the direction of current that flows along the first current path through the aperture.

The embodiments disclosed herein can help realize a versatile sensor that can be used for measuring AC as well as DC currents, with an element inserted in series with the current carrying path, while providing all the advantages of using a Rogowski coil—i.e., galvanic isolation, high bandwidth, linear response across a wide dynamic range. The sensor can be realized by using a set of controllable switches (e.g., a MOSFET) and creating a set of switched current paths which are enclosed by the Rogowski coil. A signal conditioning stage can extract the switched current and use that to measure the total current carried by the conductor. The system can be realized on a PCB as a bolt-on device which can be integrated into a system with minimal modifications. In one of the embodiments, by using the switches in series with the current carrying path, it is possible to interrupt the current and provide the ability to interrupt the current, thus transforming the passive current sensor into an active device that can be used to disconnect the asset when required. For instance, when certain rules or thresholds are violated—e.g., in cases of faults. This allows certain assets to be disconnected when needed.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. An active universal AC and DC current sensor configured for both AC and DC current measurement comprising:
   a current input configured to receive an incoming AC current waveform and an incoming DC current waveform;
   a first current path between the current input and a current output;
   a second current path between the current input and the current output parallel to the first current path;
   a Rogowski coil; and
   a controller configured to:
      provide the current sensor with a current waveform converter configuration in which the incoming AC current waveform is converted into a pulsed train and the incoming DC current waveform is converted into a switched current waveform;
      receive a current sensor signal from the Rogowski coil; and
      generate an output signal indicative of current flow through the Rogowski coil;
   wherein the first current path comprises a first switch, such that when the first switch is closed, current can flow along the first current path between the current input and the current output, and when the first switch is opened, current is precluded from flowing along the first current path between the current input and the current output;
   wherein the second current path comprises a second switch, such that when the second switch is closed, current can flow along the second current path between the current input and the current output, and when the second switch is opened, current is precluded from flowing along the second current path between the current input and the current output; and
   wherein the Rogowski coil has an aperture, wherein at least one of the first current path or the second current path pass through the aperture.

2. The current sensor of claim 1, wherein the first and second switches comprise a semiconductor switch.

3. The current sensor of claim 1, wherein only one of the first and second current paths passes through the aperture of the Rogowski coil.

4. The current sensor of claim 1, wherein each of the first and second current paths passes through the aperture of the Rogowski coil.

5. The current sensor of claim 4, wherein the first current path forms a loop such that when the first switch is closed, current passes along the first current path through the aperture in a first direction, and when the second switch is closed, current passes along the second current path through the aperture in a second direction opposite the first direction.

6. The current sensor of claim 1, wherein the controller is further configured to operate in a connected state and a disconnected state;
   wherein, in the disconnected state, the first and second switches are opened; and
   wherein, in the connected state, at least one of the first and second switches is closed.

7. The current sensor of claim 1, wherein the controller comprises a signal conditioning circuit configured to condition the current sensor signal from the Rogowski coil.

8. The current sensor of claim 7, wherein the signal conditioning circuit comprises:
   a front-end amplifier circuit configured to receive the current sensor signal from the Rogowski coil and generate an amplified current sensor signal;
   an integrator circuit configured to receive the amplified current sensor signal and generate an integrated current sensor signal; and
   a rectifier circuit configured to receive the integrated current sensor signal and generate a rectified current sensor signal.

9. The current sensor of claim 8, wherein the signal conditioning circuit further comprises a low-pass filter circuit configured to receive the rectified current sensor signal and generate a low-pass filtered current sensor signal.

10. The current sensor of claim 7, wherein the controller is a microcontroller configured to receive an output of the signal conditioning circuit and generate the output signal indicative of the current flow through the Rogowski coil.

11. The current sensor of claim 1, wherein the controller comprises a switching circuit configured to control the first and second switches.

12. The current sensor of claim 11, wherein the switching circuit is configured to provide the current sensor with the current waveform converter configuration by implementing a switching pattern that mimics a square wave pulse train with a predetermined duty ratio.

13. An active universal AC and DC current sensor configured for both AC and DC current measurement comprising:
- a current input configured to receive an incoming AC current waveform and an incoming DC current waveform;
- a current output;
- a first current path between the current input and the current output, the first current path comprising a first resistor;
- a second current path between the current input and the current output parallel to the first current path, the second current path comprising:
  - a switch, such that when the switch is closed, current can flow along the second current path between the current input and the current output, and when the switch is opened, current is precluded from flowing along the second current path between the current input and the current output; and
  - a second resistor in series with the switch;
- a Rogowski coil having an aperture, wherein the second current path passes through the aperture; and
- a controller configured to control the switch and to receive a current sensor signal from the Rogowski coil;
- wherein the controller comprises a switching circuit configured to implement a switching pattern that mimics a square wave pulse train with a predetermined duty ratio;
- wherein the controller is further configured to operate in a connected state and a disconnected state;
- wherein, in the disconnected state, the switch is opened; and wherein, in the connected state, the switch is closed.

14. The current sensor of claim 13, wherein the switch comprises a semiconductor switch.

15. The current sensor of claim 13, wherein the controller further comprises a signal conditioning circuit configured to condition the current sensor signal from the Rogowski coil.

16. The current sensor of claim 15, wherein the signal conditioning circuit comprises:
- a front-end amplifier circuit configured to receive the current sensor signal from the Rogowski coil and generate an amplified current sensor signal;
- an integrator circuit configured to receive the amplified current sensor signal from the Rogowski coil and generate an integrated current sensor signal;
- a rectifier circuit configured to receive the integrated current sensor signal and generate a rectified current sensor signal; and
- a low-pass filter circuit configured to receive the rectified current sensor signal and generate a low-pass filtered current sensor signal.

17. The current sensor of claim 15, wherein the controller further comprises is a microcontroller configured to receive an output of the signal conditioning circuit and generate a signal indicative of a current flow through the Rogowski coil.

18. The current sensor of claim 15, wherein the signal conditioning circuit comprises an analog-to-digital converter configured convert the current sensor signal from an analog signal to a digital signal.

19. The current sensor of claim 13, wherein the switch has an on-state resistance;
- wherein the second resistor has a resistance of between 10 and 100 times the on-state resistance; and
- wherein each of the first and second resistors has a temperature coefficient of resistance of less than 100 ppm.

20. The current sensor of claim 13 further comprising at least one temperature sensor configured to measure one or more of an ambient temperature and a temperature of a location along one or more of the first and second current paths;
- wherein the controller is further configured to account for variations in the one or more of the ambient temperature and the temperature of the location along one or more of the first and second current paths to measure a current passing through the Rogowski coil.

21. A current sensor for sensing an AC or DC current in a power converter, the power converter having one or more legs, the one or more legs having a current input, a current output, a first current path from the current input to the current output and comprising a first switch, and a second current path from the current input to the current output and comprising a second switch, the current sensor comprising:
- a Rogowski coil having an aperture, wherein the first current path and the second current path pass through the aperture, the Rogowski coil configured to transmit a current sensor signal indicative of a direct current flowing through the first and second current paths;
- a signal conditioning circuit configured to receive the current sensor signal from the Rogowski coil, wherein the signal conditioning circuit comprises:
  - a front-end amplifier circuit configured to receive the current sensor signal from the Rogowski coil and generate an amplified current sensor signal;
  - an integrator circuit configured to receive the amplified current sensor signal and generate an integrated current sensor signal;
  - a rectifier circuit configured to receive the integrated current sensor signal and generate a rectified current sensor signal; and
  - a low-pass filter circuit configured to receive the rectified current sensor signal and generate a low-pass filtered current sensor signal; and
- a controller configured to receive the low-pass filtered current sensor signal and generate a signal indicative of a current flow through the Rogowski coil;
- wherein the first and second switches comprise a semiconductor switch; and
- wherein the second current path forms a loop such that when the second switch is closed and the first switch is opened, current passes along the second current path through the aperture in a first direction, and when the first switch is closed and the second switch is opened, current passes along the first current path through the aperture in a second direction opposite the first direction.

* * * * *